United States Patent
Pinckaers

[15] 3,702,431
[45] Nov. 7, 1972

[54] CONDITION RESPONSIVE MODULATING MOTOR CONTROL SYSTEM

[72] Inventor: Balthasar Hubert Pinckaers, Edina, Minn.

[73] Assignee: Honeywell, Inc., Minneapolis, Minn.

[22] Filed: Dec. 3, 1971

[21] Appl. No.: 204,567

[52] U.S. Cl. .................... 318/471, 318/676, 307/117
[51] Int. Cl. ............................................. G05b 11/01
[58] Field of Search ............ 318/471, 475, 676, 678; 307/117

[56] References Cited

UNITED STATES PATENTS

| 3,523,233 | 8/1970 | Cropper | 318/677 X |
| 3,525,916 | 8/1970 | Chodash | 318/471 X |
| 3,566,151 | 2/1971 | Wilburn | 307/117 |
| 3,639,824 | 2/1972 | Malavasi | 318/678 X |

Primary Examiner—Benjamin Dobeck
Attorney—Lamont B. Koontz et al.

[57] ABSTRACT

A condition responsive circuit, disclosed as including two temperature responsive elements, is adapted to be connected to a pair of identical amplifiers which are biased to different operating levels. The amplifiers each have outputs that are connected to different silicon controlled rectifiers that are in turn connected in an inverse parallel relationship. Each of the pair of amplifiers further includes a positive feedback circuit to its respective input, and a time delayed negative feedback circuit connected to its respective input. An electric motor is connected in series with an alternating current supply and a pair of silicon controlled rectifiers so that the motor can be controlled. The motor is of a type that operates in a first direction when energized by a full-wave alternating potential to load a resilient means, such as a spring. The resilient means or spring is capable of returning the motor and load in the opposite direction when energy is removed from the motor. The motor is capable of being stalled and maintained in any intermediate position by the application of unidirectional half-wave potential.

6 Claims, 2 Drawing Figures

INVENTOR.
BALTHASAR HUBERT PINCKAERS

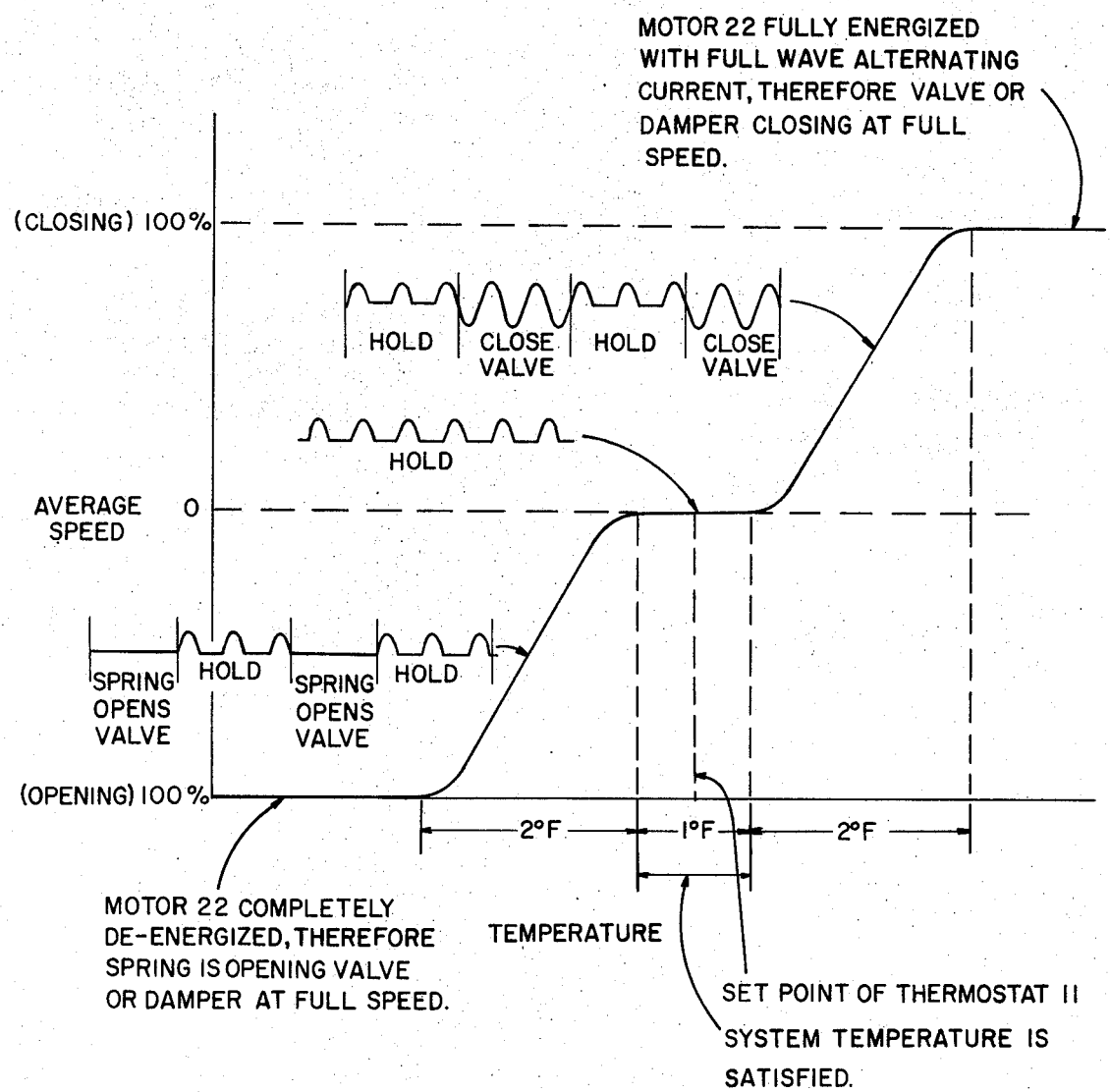

CONDITION RESPONSIVE MODULATING MOTOR CONTROL SYSTEM

BACKGROUND OF THE INVENTION

In the field of temperature control by positioning a valve or damper with a motor, normally the simpler systems include a two position arrangement in which the valve or damper is either fully opened or fully closed by the electric motor. In order to obtain a modulating type of control, the motor and circuitry used are so costly, it is prohibitive as a means of control except in limited applications. It is thus desirable to find a way to utilize an inexpensive motor, such as a simple synchronous motor, that can be operated to position the valve in a modulating manner rather than in the normal off-on type of control where the motor drives the valve or damper either to an open or a closed position.

SUMMARY OF THE INVENTION

The present invention is directed to a condition responsive circuit or thermostat that utilizes one or more thermistors to sense temperature and control a pair of amplifiers in an unusual fashion. The amplifiers include both positive and negative feedback, with the negative feedback being delayed in time by the use of capacitors, so that the output of amplifiers is in effect a time modulated output. This time modulated output is used to control a pair of solid state switches such as silicon controlled rectifiers that are connected in an inverse parallel relationship through a conventional synchronous motor, like those used in driving clocks and timers. This motor in turn is provided with a resilient loading means, such as a spring, that is compressed when the motor is operated in one direction. When the motor is de-energized, the resilient loading means or spring returns the motor and any associated load, such as a valve, to the opposite extreme. This type of motor is further capable of being stalled at any intermediate position by the application of unidirectional half-wave alternating current voltage, as opposed to the normal full-wave alternating current voltage used to operate the motor as a synchronous motor.

In the present invention, a spring loaded motor of the synchronous type that controls a temperature changing device, such as a valve, is operated in its usual manner by applying full-wave alternating current thereby driving the motor at full speed in a first direction. The motor can be stalled with full potential applied to it without damaging the motor. The motor can be energized with half-wave energy to lock the motor in any particular intermediate position which it has reached, or the motor can be allowed to be driven to its original position by the spring by the removal of all potential from the motor. With this arrangement, a complete modulating arrangement is accomplished with equipment that normally provides only two position control.

BRIEF DESCRIPTION OF THE DRAWING

FIG. 2 is a graph of temperature versus average speed of the valve or damper.

DESCRIPTION OF THE PREFERRED EMBODIMENT

Figure 1:
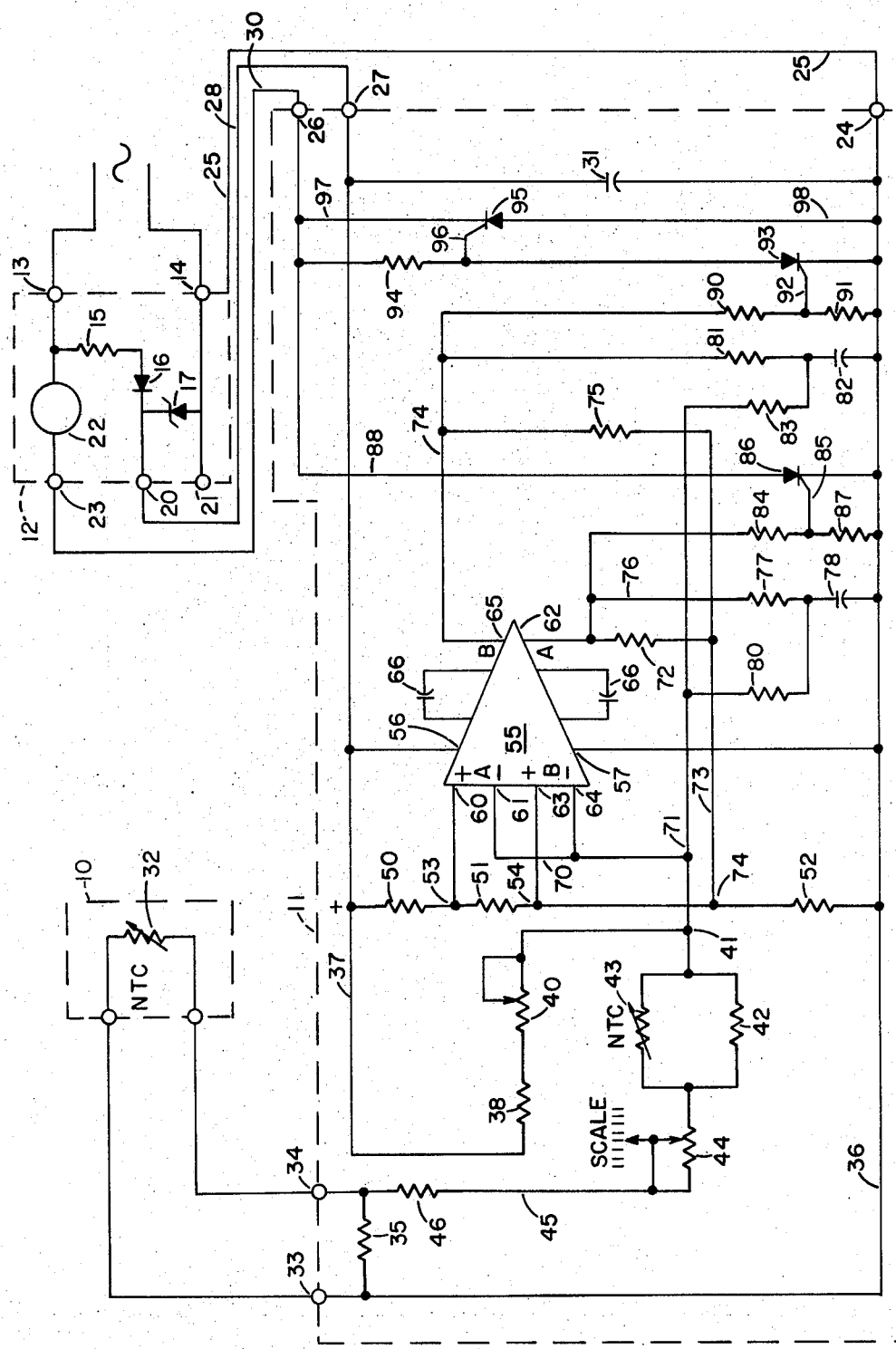
FIG. 1 of the present application is a complete schematic diagram of a condition responsive system or temperature responsive system to control a motor that in turn operates a valve to control the temperature to which the temperature responsive elements are exposed.

The drawing of the present application discloses a complete condition responsive control system and will be described as a system which is temperature responsive. A first temperature sensor 10 is disclosed along with a solid state thermostat 11, and a motorized valve or damper with a power supply 12. The sensor 10, thermostat 11, and motorized unit 12 can all be placed within the same area or room in which the temperature is to be controlled, but the temperature sensor 10 is located remote from the thermostat 11, and normally would be in proximity to the discharge air coming from the motorized unit 12. The authority or relative control influence between the sensor 10 and the thermostat 11 is, for example, in a ratio of 50 to 1. That is to say a 50° F. change in temperature as sensed by sensor 10 has the same influence as a 1° F. change sensed by thermostat sensor 43. The remote temperature sensor 10 is a desirable feature, but is not essential for the operation of the system.

The motorized valve or damper unit 12 includes a pair of input terminals 13 and 14 which are connected to a conventional source of alternating current. A resistor 15, diode 16, and zener diode 17 provide a conventional power supply with a regulated direct current potential between a pair of terminals 20 and 21.

The input terminal 13 is further connected to a motorized valve or damper 22 which is further connected to a terminal 23. The motorized valve or damper 22 has been shown schematically and includes a conventional synchronous type of motor such as is used in driving timer switches, clocks, valves, or dampers. This motorized valve or damper device further includes a resilient means, such as a spring, which is connected to the motor so that as the motor is energized and is operated, the resilient means or spring is loaded. This assembly is then connected to a valve or damper which is used to control the admission of a temperature altering medium, such as air, water, or fuel. The spring loaded motorized valve or damper 22 has the characteristic of being operated in a forward direction upon application of full-wave alternating current thereto, with this operation loading the spring as the valve or damper is operated. In the event that power is removed from the motorized valve or damper 22, the resilient means or spring drives the valve or damper 22 in the reverse direction. At any time that it is desirable to stop the motor, a dynamic braking action is provided by the application of direct current (in the form of half-wave rectified alternating current). Motorized valves or dampers that are operated in one direction under the influence of an electric motor, and in the opposite direction under the influence of the spring, are well known in the art, as is the concept of dynamic braking. As such, no structural details of the motorized valve or damper 22 have been disclosed as they are not specifically pertinent to the present invention. The mode of operating the motorized valve or damper 22 is the subject of the present invention and will be described in connection with the solid state thermostat 11.

The solid state thermostat 11 has a terminal 24 and a conductor 25 that are connected to terminal 14 of unit 12. A further pair of terminals 26 and 27 are connected by conductors 30 and 28, respectively, to terminals 23 and 20 of unit 12. Between terminals 27 and 24, the direct current potential across the zener diode 17 is applied to a capacitor 31 where it is filtered and acts as a low voltage direct current power supply for the thermostat 11. The thermostat 11 is connected in series with the motorized valve or damper 22 of unit 12 by conductors 25 and 30. Depending on the condition of the switching circuits contained in thermostat 11, the motorized valve or damper 22 either is de-energized, energized with unidirectional rectified alternating current or half-wave voltage, or is energized with full-wave alternating current voltage. The means for accomplishing this will be described after the description of the condition or temperature sensing function of the thermostat 11.

Temperature sensor 10 includes a condition responsive element in 32 in the form of a temperature responsive resistor such as a negative temperature co-efficient thermistor. The thermistor 32 is connected to thermostat 11 at terminals 33 and 34 across a resistor 35. The resistor 35 acts to linearize the characteristics of the thermistor 32.

Terminal 33 is connected to a conductor 36 that is common and connects in turn to terminal 24 of the thermostat 11. Conductor 36 also forms the negative or ground of the direct current potential across the capacitor 31. The positive side of capacitor 31 is connected to a conductor 37 that is connected in turn to terminal 27. The conductor 37 is connected to a network including a resistor 38, a calibrating potentiometer 40, and to a junction 41. Junction 41 is connected to a parallel combination of a resistor 42 and a second condition responsive element again shown as a negative temperature co-efficient thermistor 43. The parallel combination of thermistor 43 and resistor 42 provides a linear characteristic for the temperature sensing function of the thermistor 43. The parallel combination of resistors 42 and 43 is connected to a set point potentiometer 44 which is in turn connected by conductor 45 to a resistor 46 that connects to terminal 34.

Three resistors 50, 51, and 52 are connected in series across conductors 36 and 37 and form a voltage dividing network and part of a bridge circuit which includes the previously indicated resistive elements. The voltage divider made up of resistors 50, 51, and 52 provides a means of biasing an amplifier arrangement that will be described subsequently to two different levels of operation at junctions 53 and 54 across resistor 51.

The resistive network previously described constitutes a bridge having two temperature sensitive elements 32 and 43 with outputs between the junction 41 and the junctions 53 and 54. The operation of this bridge arrangement with the two different output or operating levels will be described after the balance of the circuitry has been noted.

A block diagram of an amplifier means 55 is disclosed and the amplifier means 55 in fact is made of a pair of amplifiers A and B. Amplifier means 55 is a conventional and commercially available dual operational amplifier having two identical amplifier sections A and B. The dual operational amplifier means 55 has a single positive power terminal 56 and a ground or negative terminal 57 that serves both amplifiers A and B. The amplifier A has input terminals 60 and 61, and an output terminal 62, while the amplifier B has input terminals 63 and 64 with an output terminal 65. A pair of capacitors 66 is used externally to the amplifier means 55 in a well known manner for frequency compensation. It will be understood that the amplifier means 55, which provides two identical amplifiers A and B, is a single integrated, packaged device that is commercially available and of no direct consequence in the present invention except as two conventional amplifiers.

The input terminal 60 of amplifier A is connected to junction 53, while the input terminal 63 of amplifier B is connected to the junction 54. The negative terminal 61 of amplifier A is connected by conductor 70 to the negative terminal 64 of amplifier B. The conductor 70 is further connected to a conductor 71 that connects to the bridge junction 41 and the balance of the circuitry. It is apparent that since the amplifiers A and B have a common negative terminal but have their positive terminals connected to different potentials, as represented at junction 53 and 54, that the two amplifiers A and B are biased to two different operating levels.

The output terminal 62 of amplifier A is connected by resistor 72, to a conductor 73 and a junction 74 in the voltage divider made up of the resistors 50, 51, and 52. The voltage divider also is common to the positive terminal 60 of the amplifier A and therefore forms a positive feed-back circuit means for amplifier A.

The output terminal 65 of amplifier B is connected by conductor 74 to a resistor 75 that is in turn connected to the conductor 73 and the input to the positive terminal 63 of the amplifier B. The resistor 75 then becomes part of a positive feedback circuit means for amplifier B in the same fashion as resistor 72 is in the positive feedback circuit means for amplifier A.

The output terminal 62 of amplifier A is further connected by conductor 76 to a resistor 77 and a capacitor 78 which forms part of a negative feedback circuit means with a time delay function created by capacitor 78. The feedback circuit means is completed by a resistor 80 that is connected back to conductor 71 that is common with the negative terminal of amplifier A.

The output terminal 65 of amplifier B is connected through the conductor 74 to a resistor 81 and capacitor 82 along with a resistor 83 that are similar to the resistor 77, capacitor 78, and resistor 80. The resistor 83 is connected to conductor 71 and forms part of a negative feedback circuit means with a time delay created by the capacitor 82 for the amplifier B in the same manner that a time delayed negative feedback path is created for amplifier A. The resistance values of the feedback circuits of both amplifiers A and B have been selected so that the total resistance in the negative feedback circuit is smaller than the resistance in the positive feedback circuit.

The output terminal 62 of amplifier A is further connected by a resistor 84 to a gate 85 of a silicon controlled rectifier 86 and provides a controlling or gating signal across a resistor 87. The silicon controlled rectifier 86 forms a first of a pair of unidirectional solid state switch means and is connected by conductor 88 to terminal 26 of thermostat 11.

The output terminal 65 of amplifier B is connected through conductor 74 to a pair of resistors 90 and 91 that form a gating circuit to a gate 92 of a silicon controlled rectifier 93. The silicon controlled rectifier 93 in this particular circuit is used as a high voltage PNP transistor for signal coupling, and is not an output device in and of itself. The silicon controlled rectifier 93 is in series with a resistor 94 to the terminal 26. The resistor 94 acts as a means of gating a further silicon controlled rectifier disclosed at 95 which has its gate 96 connected to resistor 94. The silicon controlled rectifier 95 is the second of the pair of unidirectional solid state switch means and is connected in an inverse parallel relationship with the silicon controlled rectifier 86 by conductors 97 and 98.

OPERATION

Assume at first that the motorized valve or damper 22 associated with unit 12 is stopped in an intermediate position between full closed and full open. This means that the motor is receiving half-wave direct current excitation through silicon controlled rectifier 86. This in turn means that amplifier A is "on" or that its output voltage is high, thereby rendering silicon controlled rectifier 86 conductive when terminal 13 is positive with respect to terminal 14. Also, in this assumed condition, silicon controlled rectifier 95 and silicon controlled rectifier 93 are not conductive because amplifier B is not "on" and hence its output voltage is low. To cause amplifiers A and B to be in these respective states it is necessary that the voltage or potential of junction 41 with respect to conductor 36 (common negative of the circuit) is a little lower than the potential existing at junction 53.

Now, assume that the temperature as sensed by sensor 43 in thermostat drifts downward. The result of this is that the potential at junction 41 drifts upward. This continues until this potential is nearly the same as the potential prevailing at junction 53. Upon reaching that value amplifier A, which in effect is used as a sensitive switching circuit, regeneratively turns "off" so that its output voltage at 62 suddenly becomes low and now also silicon controlled rectifier 86 is no longer conductive. The regenerative switching occurs, as the result of positive feedback through resistor 72.

It is clear that, upon amplifier A turning "off", and silicon controlled rectifier 86 no longer receiving gating current, the motor 22 is totally de-energized thereby allowing the spring to start opening the associated damper or valve more in order to satisfy the demand for more heat as evidenced by the total de-energization of motor 22. It is equally clear that in order to satisfy that demand for more heat, the valve or damper need be opened only a small amount more. Therefore the valve should, under the assumed condition, open at a very low average speed so as to thereby give both sensor 43 and sensor 32 a chance to sense the result of the valve opening before the valve has opened much more. This speed control action, as it were, is provided by the time delayed negative feedback associated, in our example, with amplifier A. Prior to turn "off" of amplifier A capacitor 78 was charged to some value of voltage.

As previously described, if the output at 62 of amplifier A is suddenly turned "off", it can be seen that the feedback current in resistor 80 will begin to change. When the magnitude of this current change, which also affects the potential at junction 41, is of such a value that it equals the magnitude of current change (upon "off" switching) which occurred in resistor 72, amplifier A will suddenly turn "on" again. This happens because at that point in time the negative feedback (through resistor 80 to junction 41) equals the positive feedback (through resistor 72 to junction 41) so that once again, without any change in the resistances of sensors 43 and 32, the potential at junction 41 is nearly the same as that at junction 53. Once amplifier A has turned "on" again it can be seen that its output will again recharge capacitor 78 to a higher potential and by so doing will in time raise the potential at junction 41 to again turn "off" amplifier A.

It is therefore clear that the output at 62 of amplifier A cycles "on" and "off" automatically. The ratio of "on" to "off" time (or vice versa) is determined by the specific sensor temperatures. It is equally clear that the spring can move the valve or damper (and motor) toward the full open position only when the output of amplifier A is not present (no braking). Hence, what has been provided is, in effect, a speed control to reposition (here open) the valve with a speed that is proportional to the required correction. If the system and circuit parameters have been correctly determined this means, as a practical benefit, that although there is no motor position feedback potentiometer, the valve or damper is repositioned to a new position without overshoot and or hunting which results in very good temperature control.

A similar case can be described for amplifier B which is turned "on" when the valve must be repositioned toward the closed position, but not all the way closed. The missing half of the full-wave alternating current is pulsed "on" and "off".

Summarizing then, the specific valve or motor position is determined by the (composite) sensor temperatures. The average speed with which the valve or damper 22 is repositioned from any valve position between full open and full closed is determined by the amount of temperature correction (up or down) that is needed.

Since the temperature sensing means 10 is directly in the discharge air from the motorized valve or damper unit 12, it nearly immediately senses the presence or absence of the heating fluid or media and provides the bridge in the thermostat 11 with a corrective signal that is not delayed by the time normally necessary to change the temperature of the sensor 43 in thermostat 11. While this feature is not essential to the operation of the present invention, it does lend accuracy and stability to some control systems and is very desirable.

The essential part of the present invention is the idea of controlling the average speed of a motorized valve or damper with either full-wave alternating current to drive it in one direction, or allowing the spring to operate it in the opposite direction when no energy is supplied, along with the concept of being able to lock the device in any intermediate position by the application of unidirectional or half-wave voltage. This is accomplished by the use of a time delayed negative feedback that is larger in ultimate magnitude than the positive feedback in the amplifier channels. This provides a modulated arrangement so that the motor can be energized in a manner that effectively locks the valve or damper 22 in the proper position rather than allowing it to drive between two opposite extremes, as is the normal or conventional case with this type of motorized valve equipment.

The embodiments of the invention in which an exclusive property or right is claimed are defined as follows:

1. A condition responsive control system adapted to control condition changing means by way of an electric motor that is operated in a forward direction upon application of full-wave alternating current thereby loading resilient means with said resilient means capable of returning the motor in a reverse direction to a starting position of the motor when electric power is removed from said motor, and with said motor further being capable of being stalled in any intermediate position by application of a unidirectional voltage applied to said motor, including: condition responsive means having an output voltage that varies in magnitude with variations in a condition sensed by said condition responsive means; a pair of amplifier means each having input and output means; said amplifier means each having a different operating level and having their input means connected to said condition responsive output voltage; said amplifiers means each further having positive feedback circuit means and time delayed negative feedback circuit means connected between said amplifier input and output means to provide an output from each amplifier means as a function of the magnitude of said condition responsive output voltage; a pair of unidirectional solid state switch means connected in inverse parallel relationship with said pair of switch means further connected in series with said electric motor and adapted to connect said motor to a source of alternating current voltage; and output circuit means connecting each of said amplifier output means to control one of said solid state switch means; said motor adapted to operate said condition changing means to which said condition responsive means is ultimately responsive to establish a controlled condition.

2. A condition responsive control system as described in claim 1 wherein said condition responsive means is a temperature responsive means and includes bridge circuit means having temperature responsive resistance means to sense temperature.

3. A condition responsive control system as described in claim 2 wherein said temperature responsive resistance means includes two temperature responsive resistors responsive to temperatures in two different locations.

4. A condition responsive control system as described in claim 2 wherein said time delayed negative feedback circuit means includes a capacitor in each of said delayed negative feedback circuit means to establish a delayed negative feedback with respect to a positive feedback in said positive feedback circuit means.

5. A condition responsive control system as described in claim 4 wherein said pair of unidirectional solid state switch means are a pair of silicon controlled rectifiers.

6. A condition responsive control system as described in claim 5 wherein said temperature responsive resistance means includes two temperature responsive resistors responsive to temperatures in two different locations, and said resistors being of different values to establish different effects in said bridge circuit means.

* * * * *